United States Patent
Djordjevic et al.

(10) Patent No.: US 10,498,449 B2
(45) Date of Patent: Dec. 3, 2019

(54) SECURED HYBRID CODED MODULATION FOR 5G—AND BEYOND—ACCESS NETWORKS

(71) Applicant: NEC LABORATORIES AMERICA, INC., Princeton, NJ (US)

(72) Inventors: Ivan B. Djordjevic, Tucson, AZ (US); Shaoliang Zhang, Princeton, NJ (US); Ting Wang, Windsor, NJ (US)

(73) Assignee: NEC CORPORATION (JP)

( * ) Notice: Subject to any disclaimer, the term of this patent is extended or adjusted under 35 U.S.C. 154(b) by 0 days.

(21) Appl. No.: 15/922,197

(22) Filed: Mar. 15, 2018

(65) Prior Publication Data
US 2018/0269972 A1  Sep. 20, 2018

Related U.S. Application Data

(60) Provisional application No. 62/471,643, filed on Mar. 15, 2017.

(51) Int. Cl.
| | |
|---|---|
| H04B 10/00 | (2013.01) |
| H04B 10/2575 | (2013.01) |
| H04B 10/11 | (2013.01) |
| H04B 10/516 | (2013.01) |
| H04B 7/0413 | (2017.01) |

(52) U.S. Cl.
CPC ....... H04B 10/2575 (2013.01); H04B 7/0413 (2013.01); H04B 10/11 (2013.01); H04B 10/516 (2013.01)

(58) Field of Classification Search
CPC .............. H04B 10/112; H04B 10/1123; H04B 10/1127; H04B 10/1129; H04B 10/1125; H04B 10/114; H04B 10/1143; H04B 10/1149; H04B 10/2575; H04B 10/25752; H04B 10/25753; H04B 10/516; H04B 10/502; H04B 10/503; H04B 10/118
USPC ........ 398/115, 116, 117, 118, 119, 127, 128, 398/130, 129, 131, 135, 136, 158, 159, 398/33, 38, 45, 48, 49, 2, 3, 5, 44, 121, 398/122, 123, 124, 125; 370/328, 329, 370/338, 352, 392, 335
See application file for complete search history.

(56) References Cited

U.S. PATENT DOCUMENTS

| | | | | |
|---|---|---|---|---|
| 6,763,195 | B1 * | 7/2004 | Willebrand | H04B 10/1123 398/115 |
| 8,923,701 | B2 * | 12/2014 | D'Errico | H04B 10/032 398/115 |
| 2012/0308235 | A1 * | 12/2012 | Pusarla | H04B 10/1121 398/79 |
| 2016/0088511 | A1 * | 3/2016 | Nguyen | H04L 5/006 398/115 |
| 2018/0026722 | A1 * | 1/2018 | Ashrafi | H04B 10/40 398/115 |

* cited by examiner

*Primary Examiner* — Hanh Phan
(74) *Attorney, Agent, or Firm* — Joseph Kolodka

(57) ABSTRACT

Aspects of the present disclosure describe systems, methods, and structures that advantageously provide hybrid free-space optical (FSO)-radio frequency (RF) communication links (HFRCLs) that enable building integrated software-defined network (SDN) infrastructure capable of integrating ultra-high-throughput satellite networks, composite wireless infrastructures, heterogeneous networks (HetNets), hybrid networks, satellite networks, and fiber-optics networks—among others.

4 Claims, 11 Drawing Sheets

SECURED HYBRID CODED MODULATION FOR 5G—AND BEYOND—ACCESS NETWORKS

CROSS REFERENCE TO RELATED APPLICATIONS

This application claims the benefit of Untied States Provisional Patent Application Ser. No. 62/471,643 filed Mar. 15, 2017 which is incorporated by reference as if set forth at length herein.

TECHNICAL FIELD

This disclosure relates generally to optical communications and more specifically to optical access networks enabling 5G—and beyond—wireless networks providing open communications platforms integrating cellular, satellite data centers, business/home gates and future open and cloud networks.

BACKGROUND

As is known, deploying new optical fiber for optical communications facilities and networks constructed therefrom is quite expensive. Consequently, the art has expended considerable intellectual and financial capital developing and/or deploying technologies that facilitate and/or enhance transmission capacity of existing facilities. Notwithstanding this considerable expenditure, there remains a continuing need for systems, methods, and structures that enhance the transmission capacity and information carrying ability of optical communications networks and such systems, methods, and structures would represent a welcome addition to the art.

SUMMARY

An advance in the art is made according to aspects of the present disclosure directed to systems, methods, and structures that advantageously provide hybrid free-space optical (FSO)-radio frequency (RF) communication links (HFRCLs) that enable building integrated software-defined network (SDN) infrastructure capable of integrating ultra-high-throughput satellite networks, composite wireless infrastructures, heterogeneous networks (HetNets), hybrid networks, satellite networks, and fiber-optics networks—among others.

Viewed from a first aspect, systems, methods and structures according to the present disclosure may employ a novel adaptive, and energy-efficient channel coding and modulation technique for HFRCLs, capable of compensating of channel impairments simultaneously in both RF and FSO subsystems.

The energy efficiency is achieved by an appropriately designed multidimensional signal constellation such that the mutual information is maximized, while considering the energy constraint and a coded modulation is employed—suitable for use in multihop systems composed of RF, FSO, fiber-optic, and hybrid FSO-RF links as well as cooperative hybrid systems.

Of further advantage and in sharp contrast to the prior art, systems, methods, and structures according to the present disclosure employ mutually orthogonal spatial modes as an additional degree of freedom to enable the physical-layer security in optical networks. Since, these spatial modes-based physical layer-security scheme does not provide unconditional security, we further employ an RF subcarrier multiplexing assisted continuous variable (CV)-QKD scheme, which represents a low-complexity and a low-cost solution compared to the corresponding discrete variable (DV)-QKD schemes known in the art.

BRIEF DESCRIPTION OF THE DRAWING

A more complete understanding of the present disclosure may be realized by reference to the accompanying drawing in which:

FIG. 1(A), FIG. 1(B), FIG. 1(C), and FIG. 1(D) are schematic diagrams showing illustrative examples of HFRCLs-enabled hybrid networks in which: FIG. 1(A) shows an integrated hybrid enabled SDN infrastructure; FIG. 1(B) shows a hybrid mesh networking configuration; FIG. 1(C) shows an indoor hybrid communications configuration; and FIG. 1(D) shows a hybrid distribution HetNet infrastructure according to aspects of the present disclosure;

FIG. 3(A) bipartite graph of a raptor code; and FIG. 3(B) modified bipartite graph for joint LDPC-LT decoding according to aspects of the present disclosure;

DESCRIPTION

Figure 1A:
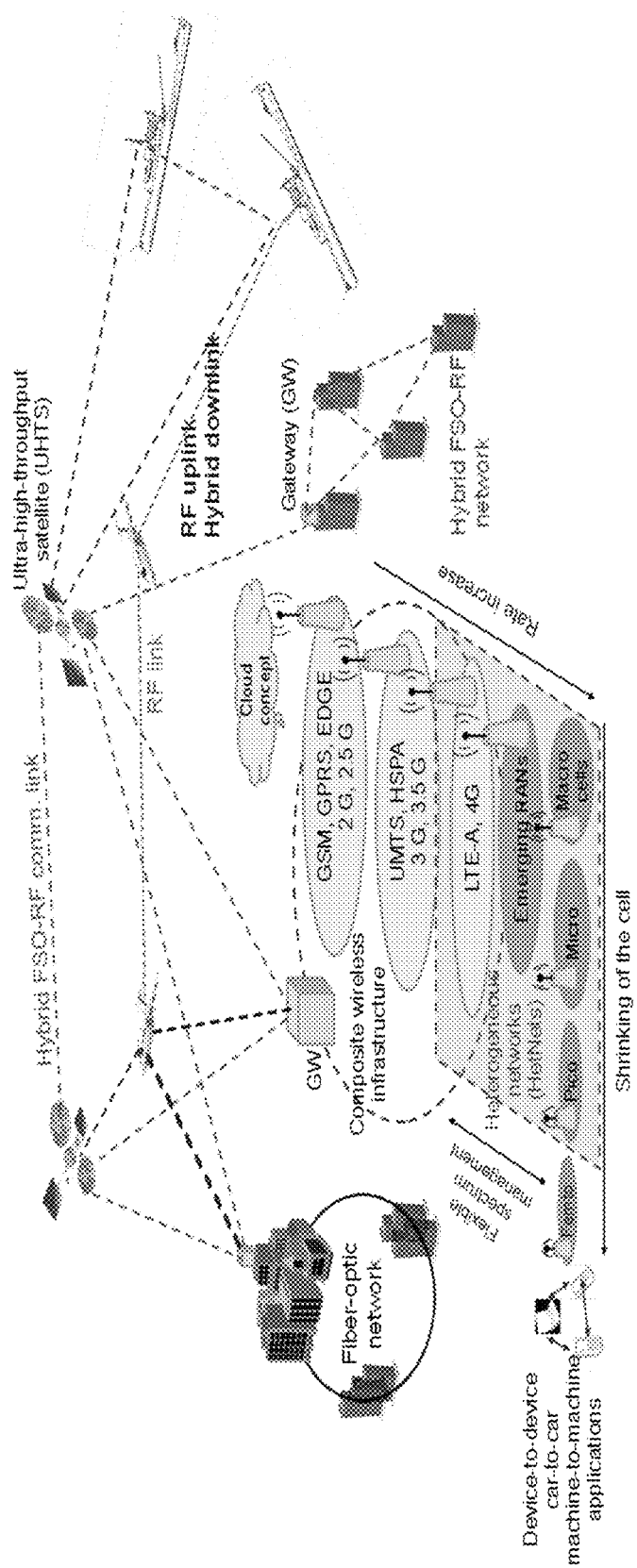

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, we note that among key challenges facing access technologies for 5G deployment—and beyond—include limited wireless bandwidth infrastructure; insufficient energy-, cost-, and resource-efficiencies; heterogeneity of network segments, high traffic demands, existence of various cell sizes (i.e., small cells), interference management, introduction of intelligence, and security issues. Moreover, 5G will be driven by user-centric considerations instead of service-centric ones (i.e., 4G).

We—like many others in the art—believe that network deployments beyond 5G will provide an open communication platform that integrates cellular systems, satellite systems, data centers, business/home gates, as well as future open and cloud networks. Accordingly, optical access networks that enable 5G deployment must therefore be scalable to provide 1-10 Gb/s at user terminals, 100 Gb/s for backhaul networks, 1 Tb/s for metro networks, and 1 Pb/s for core transport networks. Those skilled in the art will readily appreciate that such "goals" are quite ambitious and therefore difficult to achieve with currently existing optical networks technologies.

In recognition of such difficulties associated with 5G access deployment, key technological approaches may be summarized as follows:

1. Addition of small cell(s) to improve the density of existing cellular networks;
2. Provision of peer-to-peer (P2P) communication such as device-to-device (D2D) and machine-to-machine (M2M) communication—thereby enabling the multi-tier heterogeneous networks;
3. Introduction of massive multiple-input multiple-output (massive-MIMO) to improve spectral efficiency;
4. Introduction of millimeter-wave (mm-wave) communications;
5. Introduction of the cloud-based radio access network (C-RAN);
6. Virtualization of various communication resources;
7. Improving energy-efficiency;
8. Introduction of full-duplex communication; and
9. Employment of microwave photonics technologies as well as radio-over-fiber (RoF) and radio-over-FSO links.

See, e.g., E. Hossain and M. Hasan, "5G cellular: key enabling technologies and research challenges," *IEEE Instrumentation & Measurement Magazine*, vol. 18, no. 3, pp. 11-21, June 2015; A. Hakiri and P. Berthou, "Leveraging SDN for the 5G Networks: Trends, prospects and challenges," in *Software Defined Mobile Networks: Beyond LTE Network Architecture* (Series in Communications Networking and Distributed Systems 2015). Hoboken, N.J., USA: Wiley, Mobile and Wireless Communications, pp. 1-23, 978-1-118-90028-4, June 2015; M. R. Palattella, et al., "Internet of Things in the 5G Era: Enablers, Architecture, and Business Models," *IEEE Journal on Selected Areas in Communications*, vol. 34, no. 3, pp. 510-527, March 2016; and L. Cheng, M. Zhu, M. M. U. Gul, X. Ma, and G.-K. Chang, "Adaptive Photonics-Aided Coordinated Multipoint Transmissions for Next-Generation Mobile Fronthaul," *J. Lightwave Technol.*, vol. 32, no. 10, pp. 1907-1914, 2014.

At this point those skilled in the art will readily understand and appreciate that in recognition of such difficulties—it is necessary to make a dramatic improvement in the optical signal transmission rates to satisfy a foreseeable bandwidth capacity crisis. To address deficiencies for 5G—and beyond—access technologies in a simultaneous manner, systems, methods and structures according to the present disclosure employ hybrid free-space optical (FS) radio frequency (RF) communications links (HFRCLs). As we shall show and describe, HFRCLs will enable building future integrated software-defined network infrastructure, that may advantageously integrate ultra-high-throughput satellite networks, composite wireless infrastructures, heterogeneous networks (HetNets), hybrid networks, satellite networks, fiber-optics networks, and ship networks—among others.

Aspects of systems, methods, and structures according to the present disclosure advantageously employ novel adaptive, and energy-efficient channel coding and modulation techniques for HFRCLs, capable of compensating of channel impairments simultaneously in both RF and FSO subsystems.

Advantageously, and according to aspects of the present disclosure, energy efficiency is achieved by properly designing multidimensional signal constellations such that mutual information is maximized—while considering energy constraints.

Furthermore, coded modulation scheme(s) are employed that are suitable for use in multi-hop systems including RF, FSO, fiber-optic, and hybrid FSO-RF links as well as cooperative hybrid systems. Still further, systems, methods, and structures according to the present disclosure utilize mutually orthogonal spatial modes as an additional degree of freedom thereby enabling physical-layer security in optical networks. Notwithstanding this physical-layer security improvement, since such spatial modes-based physical layer-security does not provide unconditional security—systems, methods, and structures according to the present disclosure employ an RF subcarrier multiplexing assisted continuous variable (CV)-QKD scheme, which advantageously provides a low-complexity and a low-cost solution compared to the corresponding discrete variable (DV)-QKD schemes.

To address key challenges for 5G access deployment—and beyond, we employ novel adaptive and energy-efficient channel coding and modulation techniques for hybrid access networks. These techniques—according to aspects of the present disclosure—may be summarized as: (a) coded-modulation for hybrid MIMO, (b) multidimensional OAM coded-modulation, (c) rate-less coding, and (d) adaptive modulation and coding (AMC) for hybrid communication links. As will be readily appreciated by those skilled in the art, all these techniques employ error correction based on quasi-cyclic LDPC codes of large girth, suitable for hardware implementation.

The proposed hybrid MIMO is realized by employing multiple hybrid transmit and receive modules. Given that FSO and RF channels exhibit drastically different dynamics and transmission speeds, so they naturally require different coding and modulation techniques. Moreover, determining the optimum split of information bits between the two is quite challenging. Rate-adaptive LDPC-coded modulation is proposed for this purpose, which allows for adjusting the error correction strength according to the time-varying conditions of the two subsystems. The LDPC code is selected based on the channel capacity of the hybrid link, with some of the symbols transmitted over FSO and the rest over the RF channel. The same LDPC decoder is used for both sub-systems.

As noted previously, and as will be appreciated by those skilled in the art, systems, methods and structures according to the present disclosure employ a framework wherein hybrid FSO/RF links are dynamically switched between FSO-only, RF-only, and hybrid modes, depending on the observed FSO and RF channel conditions. To optimally exploit the benefits of hybrid FSO/RF communication, systems, methods and structures according to the present disclosure use joint LDPC codes for the two subsystems, with the information stream optimally split between the two (FSO and RF subsystems), which depends on the dynamics of both channels. Systems, methods, and structures according to the present disclosure exhibit a spectrally efficient, high-performance coded modulation for hybrid communication links, achieving orders of magnitude increase in the data throughput over the existing state-of-the-art wireless techniques. Lastly, to improve the security, the mutually orthogonal spatial modes are utilized as an additional degree of freedom.

Before elaborating on our secured hybrid coded modulation enabling 5G—and beyond—access, we first present a few envisioned applications of hybrid FSO-RF systems, which are summarized in FIG. 1(A)-FIG. 1(D). As will be readily understood, those shown in the figure are by no means the only applications for this technology.

As shown in FIG. 1(A), HFRCLs and FSO links advantageously enable constructing an integrated software-defined network infrastructure (SDNI), capable of integrating ultra-high-throughput satellite (UHTS) networks, composite wireless infrastructures, heterogeneous networks (HetNets), hybrid networks, fiber-optics networks, possible ship network—among others. HFRCLs advantageously, can be used as inter-satellite links (ISLs), and between satellites and ground stations, UAVs, and ships. The fiber-optic portion of the network may be a part of a Metropolitan Area Network (MAN) or Wide Area Network (WAN). Additionally, HFRCLs may be used when optical fiber installation is too expensive (e.g., in rural areas) or if it cannot be licensed and deployed in a reasonable time (in urban areas). Of further advantage, satellites can serve as nodes in a mesh network, and ISLs can be established using FSO or HFRCLs.

Figure 1B:
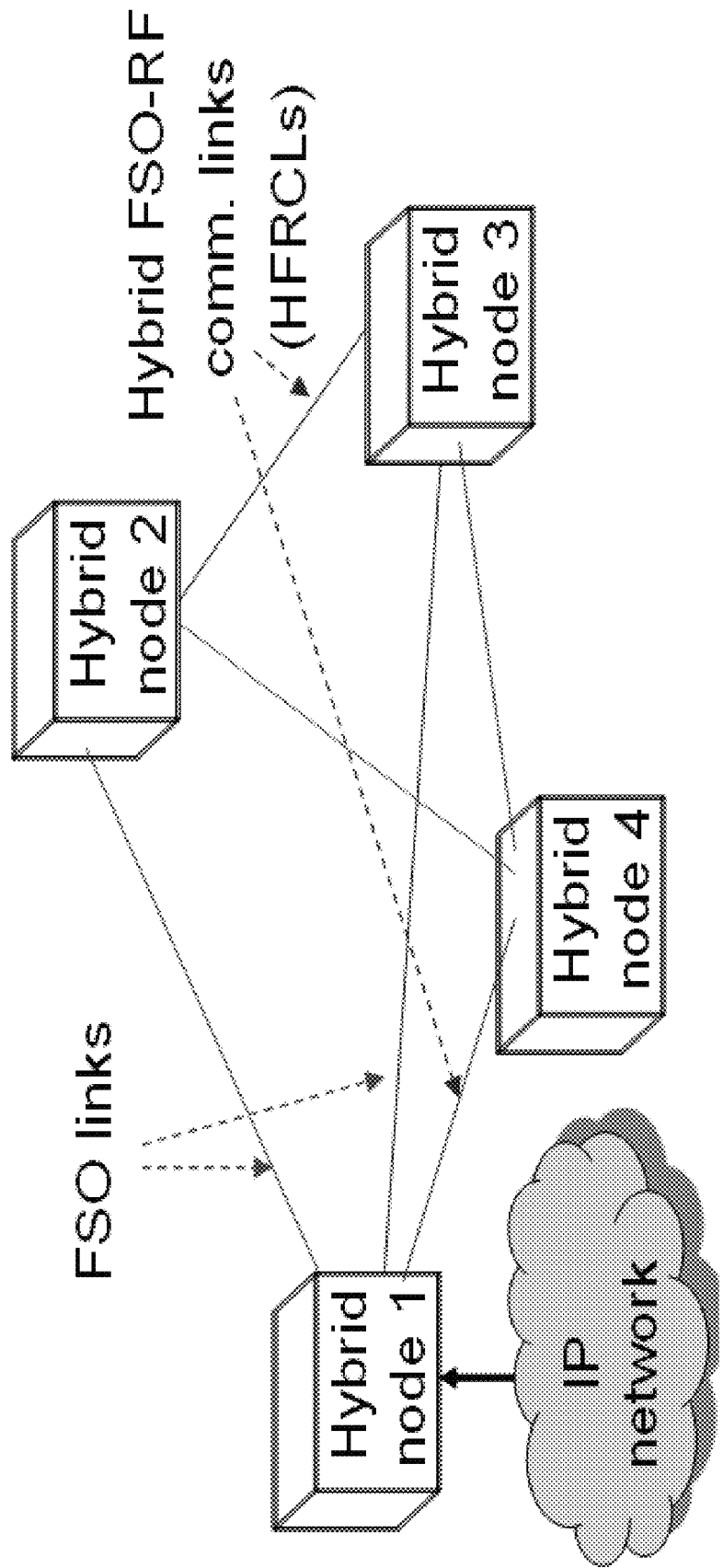

In FIG. 1(B), there is shown an application of HFRCLs in hybrid mesh networks, where hybrid nodes may be WiMAX routers, wireless mesh network (WMN) nodes, etc. The HFRCLs may advantageously be used to enable ultra-high-speed access to residential/business buildings and homes, as illustrated in FIG. 1(C).

Figure 1C:
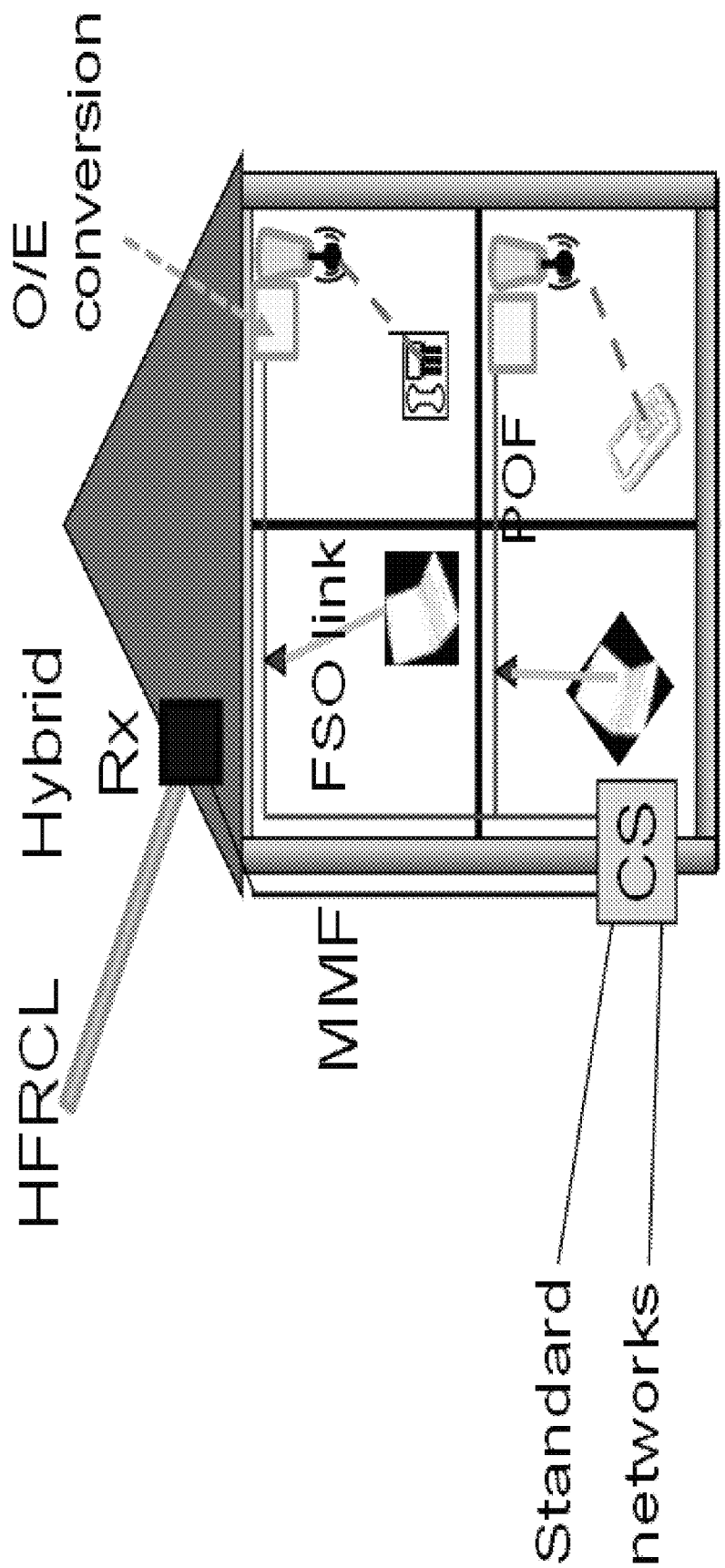

Note that in the scenario depicted in FIG. 1(C), those skilled in the art will readily understand and appreciate that the signal may be transmitted all way down to the PCs/laptops all-optically, as illustrated in FIG. 1(C). In such a scenario, the ceiling to PC/laptop link may be ether IR or visible light communication (VLC) link. However, the ceiling to PC/laptop link may also be alternative technologies including mm-wave or ultra-wideband technologies—among others.

Figure 1D:
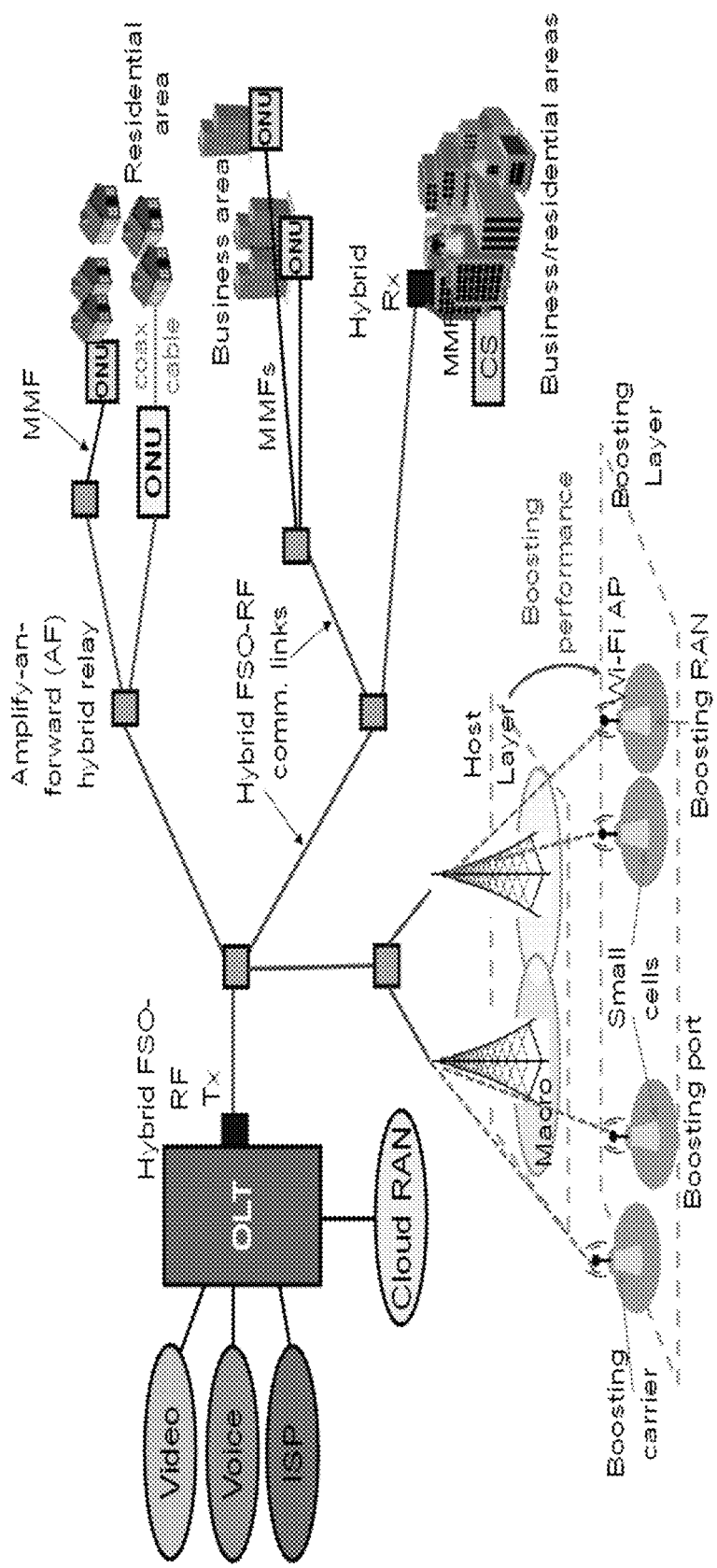

Additionally, the HFRCLs can be positioned between an optical line terminal (OLT) of the Internet Service Provider (ISP) and the optical network unit (ONU), replacing SMF links, as shown illustratively in FIG. 1(D). Passive optical couplers, often used in this part of the optical network, are now replaced by amplify-and-forward HFRCL relays.

As used in this figure, the ONU includes an optical receiver, together with a corresponding bandpass filter, for downlink traffic and a laser for uplink traffic. For unicast and multicast applications, the ONU modules can be omitted.

For WDM based applications, the OLT will include a WDM laser array, external modulators corresponding to different wavelength channels, and WDM multiplexer(s) for downlink traffic. For uplink traffic the TDM can be used, which requires maintaining the synchronization between ONUs. Alternatively, complementary wavelengths can be used for uplink traffic.

Such an approach however, requires the use of 2N wavelength channels for N remote networks/ONUs. The cloud radio access networks (RANs) can be combined with the distribution network as illustrated in FIG. 1(D). The data rate per each wavelength will be scalable to arbitrary high data rates by employing OAM multiplexing/modulation principle(s). It is also possible to use a super-channel OFDMA approach as it is compatible with SDN technology.

Adaptive, Software-Defined, Energy-Efficient Coded Modulation for Multihop and Cooperative Hybrid Communication Systems Hybrid FSO-RF MIMO: As noted previously, systems, methods, and structures according to the present disclosure employ hybrid coded modulation techniques suitable for FSO-MIMO, hybrid-MIMO, and RF-MIMO communications. To achieve high energy efficiency, we assume that the RF and FSO modules are integrated on the same chip (see, e.g., B. A. Khawaja, I. Djordjevic and M. J. Cryan, "A millimeter wave phase shifter using a wireless hybrid mode locked laser," in Proc. *OFC/NFOEC* 2009, Paper No. OTuM5, San Diego, Calif., Mar. 22-26, 2009—for initial fabrication of such devices). When the FSO channel is in either deep fade due to Mie scattering/scintillation or affected by fog then RF-MIMO will be used in massive MIMO fashion (see, e.g., E. Larsson, O. Edfors, F. Tufvesson, T. Marzetta, "Massive MIMO for next generation wireless systems," *IEEE Comm. Mag.*, vol. 52, no. 2, pp. 186-195, February 2014—with number of RF antennas in order of tens rather than hundreds) to achieve reasonably high data rates. On the other hand, when FSO channel conditions are favorable, only the FSO-MIMO subsystem will be used. Given that RF MIMO approaches are well known, while FSO MIMO is described by I. B. Djordjevic, B. Vasic, M. A. Neifeld, in "Multilevel coding in free-space optical MIMO transmission with Q-ary PPM over the atmospheric turbulence channel," that was published in *IEEE Photon. Technol. Lett.*, vol. 18, no. 14, pp. 1491-1493, July 2006; and I. B. Djordjevic, "LDPC-coded MIMO optical communication over the atmospheric turbulence channel using Q-ary pulse-position modulation," *Optics Express*, vol. 15, no. 16, pp. 10026-10032, August 2007, here we describe in more detail the third and more complex form of MIMO, namely hybrid-MIMO.

As noted previously, this regime applies when the FSO channel experiences some degradation but is nevertheless still operable. Without loss of generality, consider an HFRCL with $M_{Tx}$ hybrid transmission modules, each composed of one RF and one FSO transmit modules, and $M_{Rx}$ hybrid receive modules, each composed of one RF and one FSO receive modules. Note that an FSO transmit (receive) module contains several (e.g., 2 to 3) lasers (photodetectors), and an RF transmit/receive module contains 4 to 10 transmit/receive antennas.

A hybrid-MIMO channel can be modeled as $y=Hx+w$, where $x=[x_1 \ x_2 \ \ldots \ x_{MTx}]^T$ is the transmitted vector, $y=[y_1 \ y_2 \ \ldots \ y_{MRx}]^T$ is the received vector, $w=[w_1 \ \ldots \ w_{MRx}]^T$ is the noise vector, and H is an $M_{Rx}$-by-$M_{Tx}$ block channel matrix. The ith element of x is a "super-symbol" $x_i=(x_i^{(FSO)}, x_i^{(RF)})$, where the first component is the symbol(s) transmitted over the FSO channel and the second component is the symbol(s) transmitted over the RF channel.

Note that when the FSO channel is in good condition, only the FSO component is present. However, as the FSO channel starts to deteriorate, it becomes advantageous to operate the two channels simultaneously. Depending on the relative transmission rates of the two channels, a super-symbol may comprise an unequal number of FSO and RF symbols. The FSO symbol is N-dimensional, with different coordinates representing the projections along the various OAM eigenvectors (discussed later). The RF symbol is multi-dimensional as well, wherein 2L electrical basis functions, similar as by I. B. Djordjevic, M. Cvijetic, and C. Lin, "Multidimensional signaling and coding enabling multi-Tb/s optical transport and networking," *IEEE Sig. Proc. Mag.*, vol. 31, no. 2, pp. 104-117, March 2014; and I. B. Djordjevic, A. Jovanovic, Z. H. Peric, T. Wang, "Multidimensional Optical Transport Based on Optimized Vector-Quantization-Inspired Signal Constellation Design," *IEEE Trans. Comm.*, vol. 62, no. 9, pp. 3262-3273, September 2014; and I. B. Djordjevic, A. H. Saleh, F. Kueppers, "Design of DPSS based fiber Bragg gratings and their application in all-optical encryption, OCDMA, optical steganography, and orthogonal-division multiplexing," *Optics Express*, vol. 22, no. 9, pp. 10882-1089, 5 May 2014; and I. B. Djordjevic, "Energy-efficient spatial-domain-based hybrid multidimensional coded-modulations enabling multi-Tb/s optical transport," *Optics Express*, vol. 19, no. 17, pp. 16708-16714, Aug. 15, 2011; and I. B. Djordjevic, "On the Irregular Nonbinary QC-LDPC-Coded Hybrid Multidimensional OSCD-Modulation Enabling Beyond 100 Tb/s Optical Transport," *IEEE/OSA J. Lightwave Technol.*, vol. 31, no. 16, pp. 2969-2975, Aug. 15, 2013;—and are being used instead of only two basis functions in QAM.

The channel matrix coefficients $h_{nm}$ are composed of two components $h_{mn}=(h_{mn}^{(FSO)}, h_{mn}^{(RF)})$, where $h_{mn}^{(FSO)}$ ($h_{nm}^{(RF)}$) is the channel coefficient corresponding to the FSO (RF) subsystem. Note that FSO links can use mirrors when there is no line-of-sight (LOS) between the hybrid transmitter and receiver. In another interpretation (observed from the RF subsystem point of view), every hybrid symbol $x_h$ can be represented as a vector $x_h=[x_{FSO} \ x_{RF}]$, where $x_{FSO}$ is a vector of FSO symbols transmitted for the duration of one RF symbol $x_{RF}$.

Notice that model described above is valid in the absence of wind. In the presence of wind, we need to use the generalization described by Zhu and Khan in an article entitled "Performance bounds for coded free-space optical communications through atmospheric turbulence channels," that appeared in *IEEE Transactions on Communications*, vol. 51, no. 8, at pp. 1233-1239, in August 2003.

Note however, this FSO correlation channel model is strictly speaking valid only in the weak-turbulence regime, and a model valid in strong turbulence regime is necessary. The corresponding time-varying FSO simulation model applicable in any turbulence regime has been reported in our recent paper (see, e.g., X. Sun, I. B. Djordjevic, M. A. Neifeld, "Secret key rates and optimization of BB84 and decoy state protocols over time-varying free-space optical channels," *IEEE Photonics* vol. 8, no. 3, pp. 7904713-1-7904713-13, June 2016, DOI: 10.1109/JPHOT.2016.2570000).

According to aspects of the present disclosure we advantageously incorporate "memory" in the FSO channel model by using a Markov characterization, which would be generalization of our previous work (See, e.g., S. Denic, I. B. Djordjevic, J. Anguita, B. Vasic, and M. A. Neifeld, "Information theoretic limits for free-space optical channels with and without memory," *J. Lightw. Technol.*, vol. 26, pp. 3376-3384, 2008.)

Based on the normalized autocovariance of the channel fluctuations corresponding to 600 m of FSO link operating at 650 nm in strong turbulence regime, we have found in that the FSO channel correlation time, determined as a reciprocal of the quasifrequency, is 4.85 ms. This indicates that for multi-Gb/s FSO transmission during the deep fades, the use of either massive RF MIMO or adaptive optics techniques is necessary. For this purpose, we use the low-cost wavefront sensorless adaptive optics (AO), to reduce turbulence effects.

To deal with uncompensated turbulence effects, we employ an adaptive coding, described below. If we allow our signal designs to extend over multiple symbol-time-intervals, we can refer to these designs as "hybrid space-time" codes, analogous to the space-time codes used in wireless RF communications. Therefore, according to aspects of the present disclosure to address atmospheric turbulence effects we may advantageously employ hybrid space-time coding.

Multidimensional Orbital Angular Momentum (OAM) Coded Modulation

As noted and according to the present disclosure, energy-efficient coded modulation is achieved through efficient signal constellation design. As stated, 2L-dimensional constellations will be used for the RF component, whereas a novel design based on OAM modulation will be used for the FSO component. We first start by describing a generic approach for providing energy-efficient constellation.

The problem can be formulated as follows. Consider a set of super-symbols $X=\{x_1, x_2, \ldots, x_{Ms}\}$ that occur with a priori probabilities $p_1, \ldots, p_{Ms}$, where $p_i=\Pr(x_i)$. Let the corresponding symbol energies be $E_1, \ldots, E_{Ms}$. These super-symbols are to be transmitted over the hybrid channel. We require that $\Sigma_i \ p_i \ E_i \leq E$ (an energy constraint). In the presence of noise and various channel impairments, we can use the Lagrangian method to maximize the mutual information I(X,Y), defined as I(X,Y)=H(X)−H(X|Y), where H(X) is the entropy of the channel input X and H(X|Y) is the conditional entropy of X given the channel output Y. Taking the energy constraint into account, the corresponding Lagrangian is given by:

$$L_g = -\sum_i^{H(X)} p_i \log p_i - \left(-\sum_i p_i \sum_j^{H(X|Y)} P_{ij} \log Q_{ji}\right) + \lambda\left(\sum_i p_i - 1\right) + \mu\left(\sum_i p_i E_i - E\right)$$

where $P_{ij}=\Pr(y_j|x_i)$ denote the transitional probabilities, determined through channel estimation, and $Q_{ji}=\Pr(x_i|y_j)$, which can be determined by Bayes' rule as $$Q_{ji}=\Pr(x_i|y_j)=\Pr(x_i,y_j)/\Pr(y_j)=P_{ij}p_i/\Sigma_k P_{kj}p_k.$$

The optimum signal constellation coordinates cannot be found in analytical form. However, we can use the following energy-efficient signal-constellation design algorithm (EE-SCDA) to obtain a near-optimal result:
1. Initialization: Choose an arbitrary auxiliary input distribution and signal constellation, where the number of constellation points $M_a$ is much larger than the target signal constellation $M_s$. For a uniform distribution, $p_i=1/M_a$.
2. $Q_{ji}$ update-rule: $Q_{ji}^{(t)}=P_{ij}^{(t)}/\Sigma_k P_{kj} p_k^{(t)}$.
3. $p_i$ update-rule: $p_i^{(t+1)}=e^{-\mu E_i - H^{(t)}(x_i|Y)}/\Sigma_k e^{-\mu E_k - H^{(t)}(x_k|Y)}$, where the Lagrange multiplier μ is determined from the energy constraint.
4. The constellation points of the target constellation are taken as the center of mass of the closest $M_a/M_s$ constellation points in the auxiliary signal constellation.

Steps 2-4 are repeated until the algorithm reaches convergence. Notice that the well-known Arimoto-Blahut algorithm (See, e.g., R. E. Blahut, "Computation of channel capacity and rate distortion functions," *IEEE Trans. Inform. Theory*, vol. IT-18, pp. 460-473, 1972) does not impose an energy constraint, and yields the optimum source distribution only. Using EE-SCDA, we can obtain the optimized signal constellation while taking the energy constraint into account. Both optimum source distribution and EE signal constellation are obtained from this algorithm. This algorithm can be applied to various channel conditions, before transmission starts, and corresponding results will be stored in corresponding look-up tables (LUTs), implemented in FPGA/ASIC hardware. Based on prevailing channel conditions, during transmission, corresponding LUT, storing the coordinates of a multidimensional constellation, will be activated. On such a way, all complexities related to EE-SCDA will be solved in the installation stage.

Next, we specialize the above treatment to N-dimensional OAM modulation, which is used for the FSO part of the HFRCL. The coordinates of the EE signal constellation are used as inputs to the N-dimensional OAM modulator and shown schematically in FIG. 2. This modulator generates the constellation points as follows n $s_i=\Sigma_n \phi_{i,n}\Phi_n$, where $\phi_{i,n}$ denotes the nth OAM coordinate (n=1, . . . , N) of the ith signal-constellation point and $\{\Phi_1, \ldots, \Phi_N\}$ represents the set of N orthogonal OAM eigenstates.

We consider two possible implementations of N-dimensional OAM modulator and demodulator: volume holograms based (FIG. 2) and FMF-based. Details of the second approach can be found in an article by I. B. Djordjevic, entitled "Heterogeneous transparent optical networking based on coded OAM modulation," that appeared in *IEEE Photonics Journal*, vol. 3, no. 3, pp. 531-537, on June 2011.

Here, we describe our approach according to aspects of the present disclosure. More particularly, during OAM multiplexing, a continuous-wave laser diode signal is split into N branches through the effect of a power splitter (e.g., 1:N star coupler) to feed N electro-optical modulators, such as Mach-Zehnder modulators. Each modulator corresponds to one of the N OAM modes.

Figure 2:
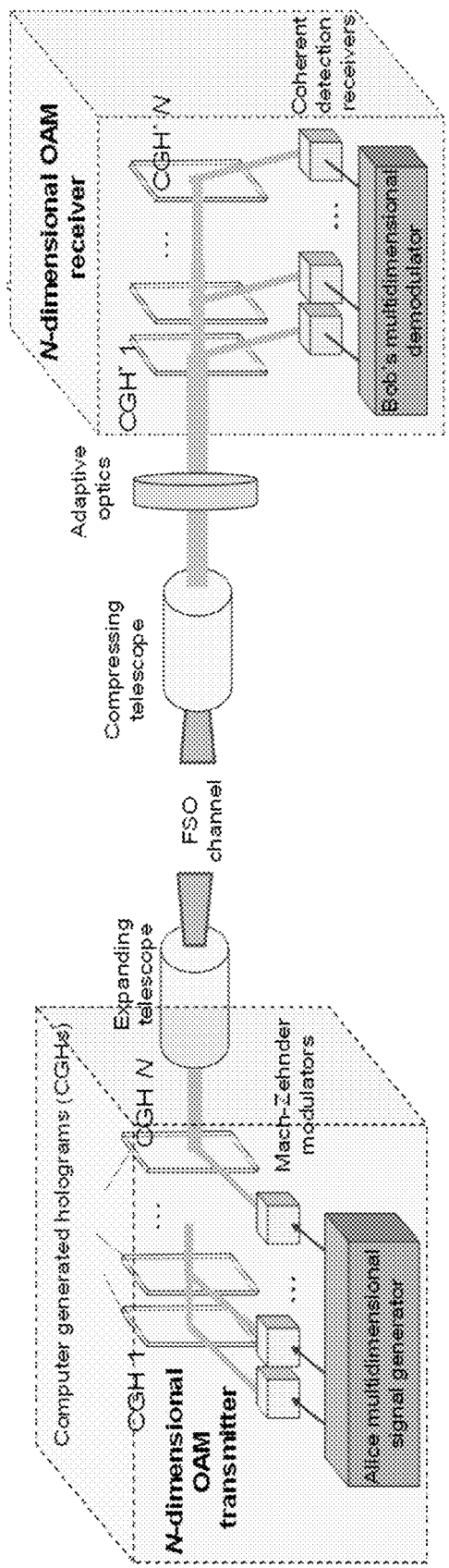
FIG. 2 is a schematic diagram showing an illustrative multidimensional LDPC-coded OAM modulation scheme based on computer generated holograms that will be used to improve both energy efficiency and increase secure key rates according to aspects of the present disclosure.

These N data-carrying $TEM_{00}$ modes illuminate a series of spatial light modulators; each programmed to generate one out of N OAM modes in use, as illustrated in FIG. 2. On a receiver side, after compressing telescope, the signal is directed to an adaptive optics subsystem to compensate for atmospheric turbulence effects. Subsequently, a series of conjugate volume holograms recorded on SLMs are used to determine the projections along corresponding OAM modes. These OAM projections (in optical domain) are used as inputs of corresponding coherent detectors to estimate the coordinates of transmitted multidimensional signal.

Note that for efficient implementation, one local laser is used for all coherent detectors. After coherent detection takes place, the corresponding outputs will be collected by coherent optical receivers, followed by ADCs. Such obtained samples will be used as inputs to N-dimensional a posteriori probability (APP) demapper, in which symbol log-likelihood ratios (LLRs) will be calculated.

To achieve a target BER, we adjust the FEC strength based on channel conditions. For long-haul FSO transmissions, we will employ a low-rate LDPC code; for transmissions over short or high-quality links, we will employ a high-rate LDPC code. Our approach to rate adaptiveness is to select the appropriate code rate that matches the SNR range for the current channel. To avoid frame synchronization issues, we keep the codeword length fixed, independent of the employed FEC code. Decoding is based on bipartite (Tanner) graph representation of LDPC codes, in which a fraction of bit nodes corresponds to the RF subsystem and the remaining fraction of bit nodes corresponds to the FSO subsystem. Distribution of RF and FSO bit nodes is determined based on channel conditions.

Raptor/Rateless Coding for Hybrid Communications

A rate adaptive code (also known as rate-less code) is an error-correcting code whose rate can be changed according to the time-varying channel conditions (see, e.g., I. B. Djordjevic, "Adaptive modulation and coding for free-space optical channels," *IEEE/OSA J. Opt. Commun. Netw.*, vol. 2, no. 5, pp. 221-229, May 2010; I. B. Djordjevic, T. Liu, and T. Wang, "On the adaptive software-defined LDPC-coded multidimensional spatial-MIMO multiband generalized OFDM enabling beyond 10 Tb/s optical transport," *IEEE Photonics Journal*, vol. 5, no. 1, Paper 7200207, February 2013; J. A. Anguita, et al., "Rateless coding on experimental temporally correlated FSO channels," *IEEE/OSA J. Lightwave Technol.*, vol. 28, no. 7, pp. 990-1002, 2010; M. Luby, "LT codes," Proc. *IEEE Symposium on Foundations of Computer Science (FOCS02)*, 43, 2002; D. J.+C. MacKay, "Fountain codes," *IEE Proc.-Commun.*, vol. 152, pp. 1062-1068, December 2005; A. Shokrollahi, "Raptor codes," *IEEE Inf. Theory*, vol. 52, pp. 2551-2567, June 2006; and I. B. Djordjevic, W. Ryan, and B Vasic, *Coding for Optical Channels*. Springer, March 2010.

The following two classes of codes are suitable for use in hybrid communication links: (i) punctured codes (the rate is varied by puncturing the parity bits so that the effective code rate is increased) and (ii) fountain codes, in particular Raptor codes (the rate is changed by increasing the codeword length).

A Raptor code is obtained by concatenating an inner error-correcting code (the pre-code), with an outer Luby-transform (LT) code. An LT Code is a sparse random linear code, with a very simple encoding and decoding algorithms.

LT encoding process can be described as follows. Each encoded symbol $x_n$ is generated from the information symbols $s_1, \ldots, s_{K_{LT}}$ in two steps: (i) randomly choose the degree $d_n$ from a degree distribution set $\Omega$, and (ii) choose uniformly at random $d_n$ distinct input symbols, and set $x_n$ equal to the bitwise sum, modulo 2, of those $d_n$ symbols. The decoder's task is to recover s from x=sG, where G is the matrix associated with the graph (the pseudorandom matrix) by a sum-product algorithm. Although the encoding and decoding algorithms are simple, LT codes have the following two drawbacks: (i) $d_n$ can take any integer value up to the size of the input word, leading to a decoding complexity of $O(K_{LT} \log K_{LT})$, where $K_{LT}$ is information symbol-word length, and (ii) the error floor is observed at high SNRs.

Figure 3A:
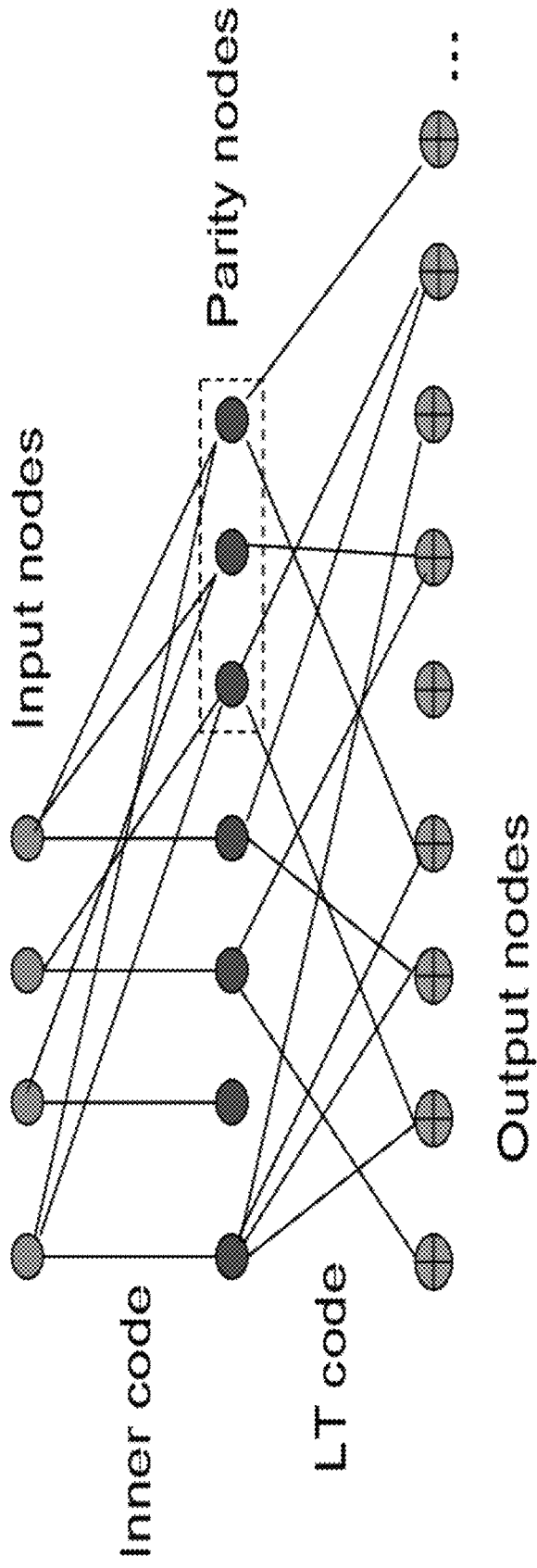
FIG. 3(A) and FIG. 3(B) are schematic diagrams showing illustrative.
Figure 3B:
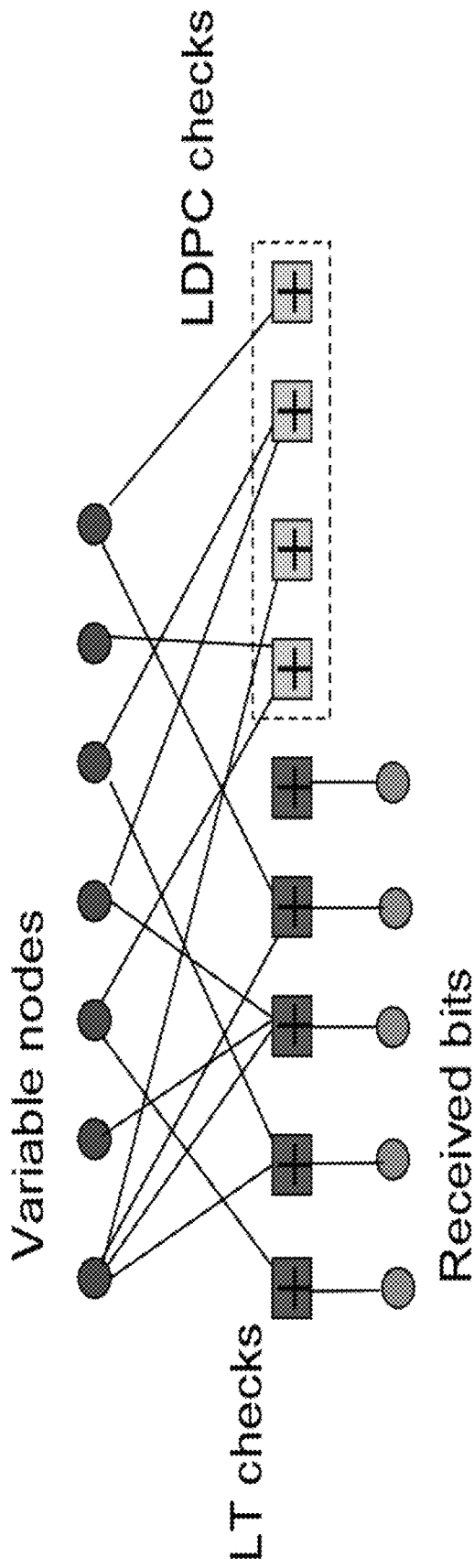

To solve both problems of LT codes simultaneously, we employ the following raptor code concept. The raptor code is formed by concatenating an inner systematic LDPC code with an outer LT code, as shown in FIG. 3(A). Note that the exact distribution of RF and FSO bit nodes is determined based on channel conditions. Since the inner LDPC code is systematic, we can modify the original bipartite graph as illustrated in FIG. 3(B), and perform joint LT-LDPC soft decoding on such a bipartite graph.

Adaptive Modulation and Coding (AMC) for Multihop and Cooperative Hybrid Systems Another approach to adjust to the hybrid channel conditions is based on adaptive modulation and coding. The AMC concept, among others, is suitable for the following applications: (i) in AMC schemes to mitigate channel impairments over various types of hybrid links; (ii) operation when the hybrid channel state information is uncertain; and (iii) in hybrid unequal error protection techniques.

We note that AMC is applicable in at least the following two scenarios: (1) a cooperative hybrid network in which FSO and RF subsystems compensate for the shortcomings of each other, and (2) a multi-hop hybrid network scenario, in which different sections of network are composed of different link types. To keep system cost low, upon conversion from optical to RF (and vice versa) domain, instead of performing retiming, amplifying and detection, we apply amplify-and-forward relaying and postpone the decoding decision to the very last node along the path.

Figure 4:
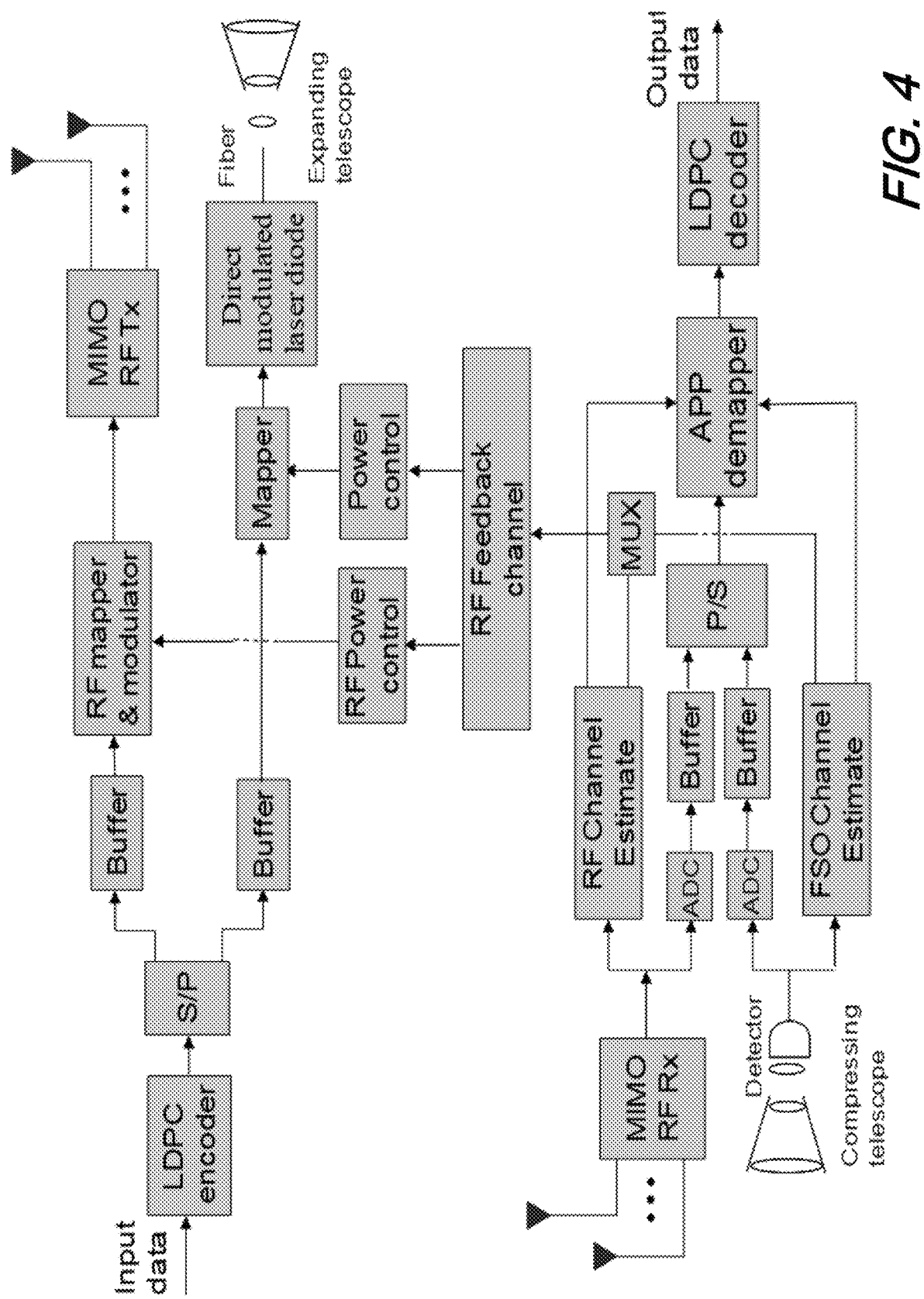
FIG. 4 is a schematic diagram showing an illustrative single-OAM mode-based hybrid system according to aspects of the present disclosure.

Those skilled in the art will appreciate that the corresponding coding scheme should now be able to deal with various types of channel impairments. The adaptive hybrid FSO-RF system, for single-hop, is shown illustratively in FIG. 4.

As may be observed, it includes two parallel FSO and RF channels. To keep exposition simple, we depict only one OAM mode per FSO link. The LDPC encoded data stream is partially transmitted over FSO and partially over RF. Operating symbol rate of the FSO channel can be many times higher than that of RF channel. However, as mentioned earlier, we are mostly concerned with such channel conditions when the FSO channel operates under either strong atmospheric turbulence or in the presence of fog. Under these channel conditions, the hybrid communication scenario is the most beneficial.

The FSO channel comprises an FSO transmitter, a propagation path through the atmosphere, and an FSO receiver. The optical transmitter includes a semiconductor laser of high launch power, an adaptive mapper, and a power control block. Operationally, the modulated beam is projected toward the distant receiver by using an expanding telescope assembly.

The RF channel comprises an adaptive RF mapper, an RF power control, an RF transmitter, one or more transmitting antennas, a wireless propagation path, one or more receiver antennas, and a MIMO RF receiver. The code rate adaptation can be achieved by varying different parameters in the parity-check matrix of the quasi-cyclic LDPC code.

Figure 5:
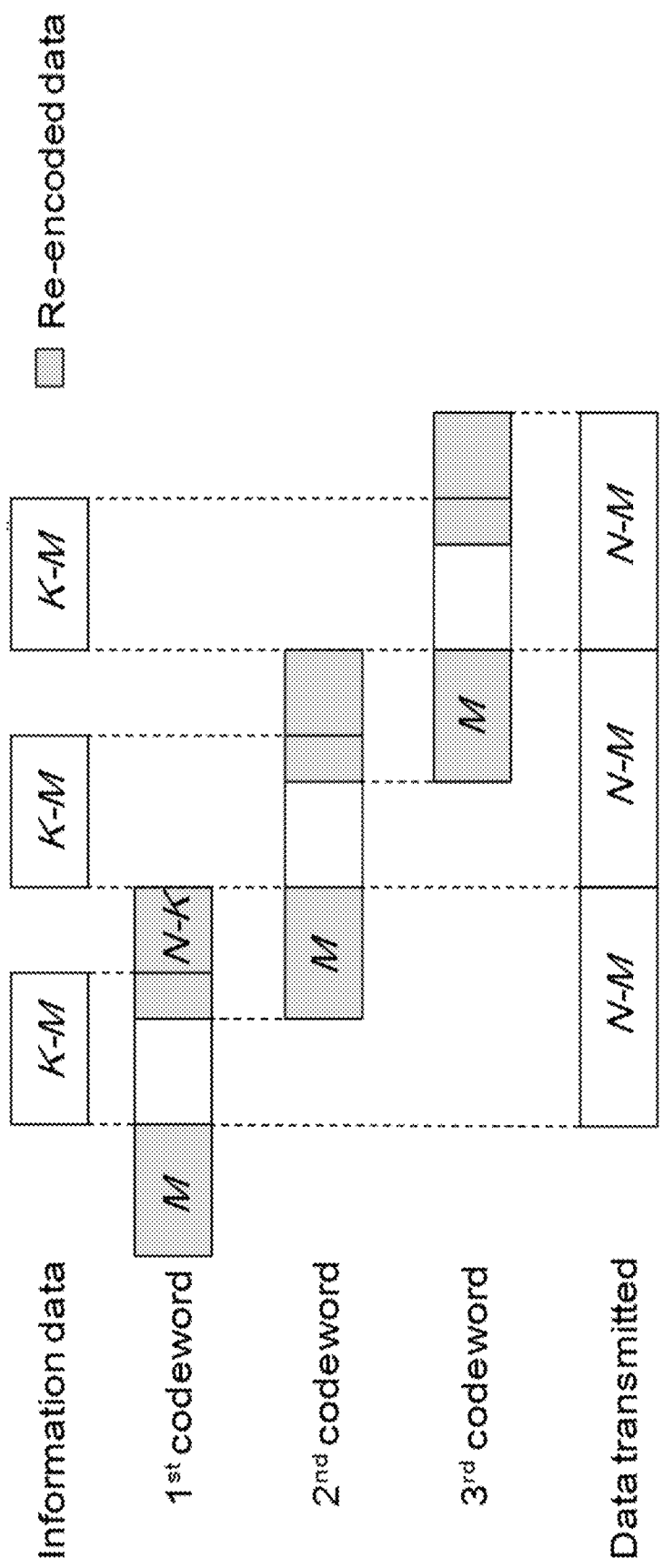
FIG. 5 is a schematic diagram showing an illustrative rate-less LDPC coding with re-encoding principle suitable for hybrid communications links according to aspects of the present disclosure.

Our third approach to adaptive coding for hybrid communication links is a rate-adaptive LDPC coding with re-encoding principle. Namely, when rate-adaptive LDPC coding is performed by puncturing parity bits, an early error floor phenomenon is introduced. In our approach according to aspects of the present disclosure, the adaptive LDPC encoder encapsulates the last M symbols of the proceeding codeword and the incoming K-M information symbols into a K-symbol vector, as illustrated in FIG. 5. In other words, each codeword is generated continuously by re-encoding the last M symbols of its preceding codeword. The actual code rate is R'=(K−M)/(N−M), where O<M<K, and can be tuned almost continuously in the range (0, R] (R is the code rate of the template LDPC code) by adjusting the re-encoded data size M.

Note that when the channel state information is uncertain, we may use the unequal error protection based on LDPC codes, generalized LDPC (GLDPC) codes (I. B. Djordjevic, L. Xu, T. Wang and M. Cvijetic, "GLDPC codes with Reed-Muller component codes suitable for optical communications," *IEEE Comm. Lett.*, vol. 12, pp. 684-686, September 2008), and generalized concatenated coding (see, e.g., V. Zyablov, S. Shavgulidze, and M. Bossert, "An Introduction to generalized concatenated codes," *European Trans. Telecomm.*, vol. 10, pp. 609-622, November-December 1999.). To address the time-varying channel conditions, the LDPC and GLDPC coding combined with LT coding, described above, is preferably employed.

Physical-Layer Security Suitable for Proposed Hybrid Communication Systems

Advantageously, with systems, methods, and structures according to the present disclosure, three types of physical-layer security schemes based on spatial modes are possible namely, classical, semi-classical, and QKD schemes—depending on the desired level of security. At this point, simultaneous reference is made to FIG. 6 and FIG. 7.

It is well-known that classical protocols rely on the computational difficulty of reversing the one-way functions, and in principle cannot provide any indication of Eve's presence at any point in the communication process. However, the optical communication links can be operated at a desired margin from the receiver sensitivity, and for known channel conditions the Eve's beam-splitting attack can be detected as it will cause sudden decrease in secrecy capacity $C_S$, defined as $C_S = C_{AB} - C_{AE}$, where $C_{AB}$ is the instantaneous capacity of Alice-Bob channel and $C_{AE}$ is the instantaneous capacity of Alice-Eve channel.

Another relevant probabilistic measure that may be used to characterize the security of optical communication link—according to aspects of the present disclosure—is the probability of strictly positive secrecy capacity, defined as $P_S^+ = \Pr(C_S > 0)$. Note that the use of conventional 2-D constellations to transmit the raw key should serve as a reference case only.

From our recent studies of spatial division multiplexing (SDM) systems, we have learned that channel capacity can be increased linearly with number of spatial modes N, rather than logarithmically with signal-to-noise ratio for conventional 2-D schemes. Such learning motivates us to employ the spatial modes to dramatically improve secrecy capacity when compared to conventional 2-D schemes.

The use of SDM schemes to increase the secret key rates is always sensitive to the crosstalk among spatial modes and potential eavesdropper can compromise the security by relying on spatial coupling, without being detected by Alice and Bob. To solve for this problem, we not only compensate for coupling among spatial modes, but also to rely on multidimensional signaling.

Figure 6:
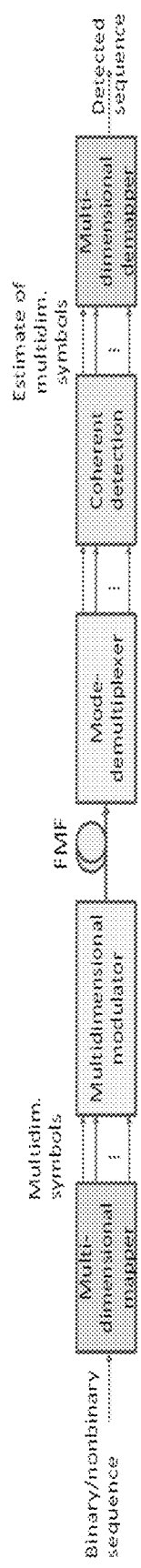
FIG. 6 is a schematic diagram showing an illustrative mode-multiplexing-based multidimensional scheme for physical layer security over FMF/MMF links according to aspects of the present disclosure.

In multidimensional signaling, the spatial modes are used as bases functions, and by detecting the signal in any particular spatial mode Eve will not be able to compromise security as only a single coordinate will be detected. Since the multidimensional signaling based on spatial modes has been already described and referenced, here we just briefly describe the corresponding multidimensional scheme to be used for raw key transmission over FMF/MMF links, which is shown in FIG. 6. The configurations of spatial-modes-based multidimensional modulator and mode-demultiplexer are already in our earlier works, which are incorporated by reference as if set forth at length herein (see, e.g., I. B. Djordjevic, M. Cvijetic, and C. Lin, "Multidimensional signaling and coding enabling multi-Tb/s optical transport and networking," *IEEE Sig. Proc. Mag.*, vol. 31, no. 2, pp. 104-117, March 2014; and I. B. Djordjevic, "On the Irregular Nonbinary QC-LDPC-Coded Hybrid Multidimensional OSCD-Modulation Enabling Beyond 100 Tb/s Optical Transport," *IEEE/OSA J. Lightwave Technol.*, vol. 31, no. 16, pp. 2969-2975, Aug. 15, 2013.).

As may be observed from the figure, Alice generates a binary sequence randomly. The multidimensional mapper can be implemented as an LUT. For signal constellation size $M_s$, the $\log_2 M_s$ bits are used to find the coordinates of multidimensional signal constellation, obtained as we have described previously. The multidimensional coordinates are used as the inputs to corresponding Mach-Zhender modulators (MZMs) of multidimensional modulator.

After the mode-multiplexing, the signal is transmitted over SDM system of interest. On receiver side, after mode-demultiplexing and coherent detection, the estimated multidimensional coordinates are used as inputs of multidimensional APP demapper, which provides the most probably symbol being transmitted, and the detected sequence is delivered to Bob. After that information reconciliation, based on systematic LDPC coding, is performed in similar fashion as already proposed for QKD applications (see, e.g., I. B. Djordjevic, L. Xu, T. Wang and M. Cvijetic, "GLDPC codes with Reed-Muller component codes suitable for optical communications," *IEEE Comm. Lett.*, vol. 12, pp. 684-686, September 2008.).

To distill from the generated key a smaller set of bits whose correlation with Eve's string falls below the desired threshold, the privacy amplification as described by I. B. Djordjevic, in a paper entitled "Integrated optics modules based proposal for quantum information processing, teleportation, QKD, and quantum error correction employing photon angular momentum," that appeared in *IEEE Photonics Journal*, vol. 8, no. 1, pp. 6600212-1-6600212-12, in February 2016; is performed with the help of the universal hash functions.

The classical OAM-based physical-layer security for FSO links that are employed in systems, methods and structures according to aspects of the present disclosure may be described as follows. The N raw key-carrying $TEM_{00}$ modes are shone on a series of SLMs; each programmed to one out of N OAM modes in use, as shown in FIG. 2. After the raw key transmission is completed, Alice encodes the raw key by employing multilevel nonbinary (ML-NB)-LDPC-coded modulation-based information reconciliation. The privacy amplification is further performed, to distill for the shorter key with negligible correlation with Eve. This key is then used for secure FSO communication.

Clearly, to get the full advantage of OAM multiplexing in strong turbulence regime, it is essential to keep the fraction of Eve's interception reasonably low. Moreover, to significantly improve aggregate secrecy capacity by using OAM multiplexing/modulation; we have to employ different approaches to deal with strong turbulence effects, as described earlier.

Figure 7:
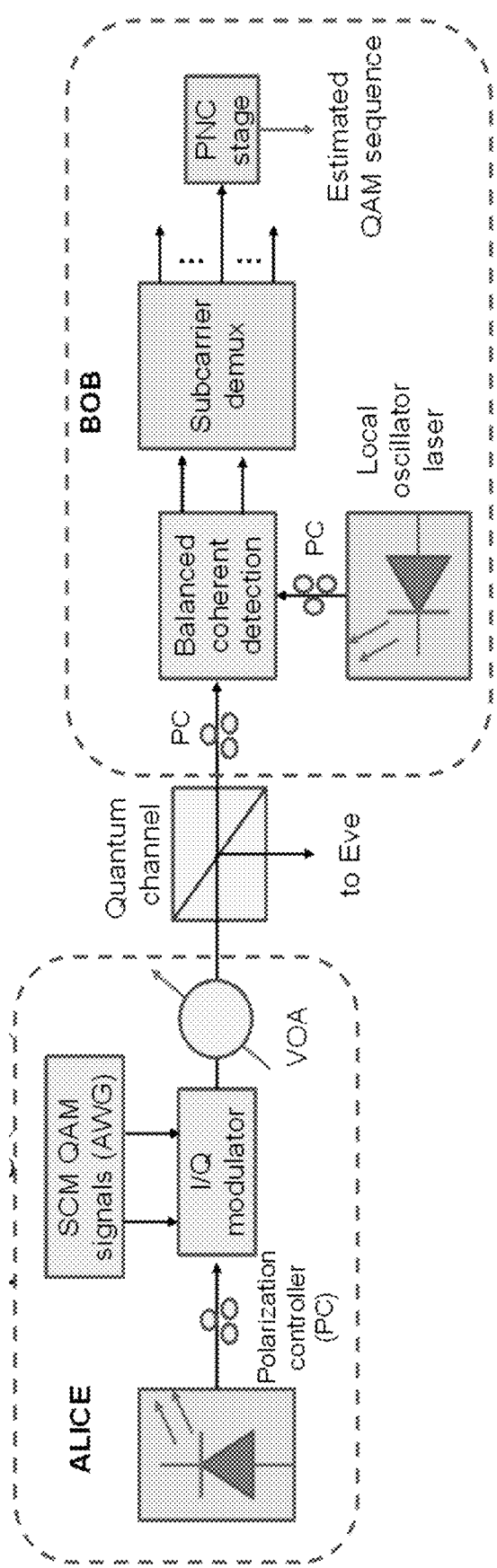
FIG. 7 is a schematic diagram showing an illustrative implementation of SCM-assisted CV-QKD system including Phase Noise Cancellation (PNC) stage and Variable Optical Attenuator (VOA) according to aspects of the present disclosure.

To provide unconditional security, we recently described an RF-subcarrier-assisted coherent detection-based CV-QKD system, where the discrete modulated signals (PSK and QAM) are prepared and sent from Alice to Bob, and a classical coherent optical detection is implemented at Bob's side, followed by the PNC stage to control the excess noise (see, e.g., Z. Qu, I. B. Djordjevic, M. A. Neifeld, "RF-subcarrier-assisted Four-state Continuous-variable QKD Based on Coherent Detection," *Optics Letters*, vol. 41, no. 23, pp. 5507-5510, Dec. 1, 2016—the entire contents of which are incorporated by reference herein as if set forth at lengh). To improve the secure key rates (SKRs) further, we may use multiple, QAM modulated, RF subcarriers in RF subcarrier multiplexing (SCM) fashion, as illustrated in FIG. 7.

Note that the RF in-phase and quadrature are used as input of electro-optical FQ modulator. The output of FQ modulator is attenuated to ensure that security at Bob's side is not affected. After the subcarrier demultiplexing, the i-th output of demux drives the phase noise cancellation (PNC) stage, comprising two square operators, one addition operator, a digital D.C. cancellation block, and a low pass filtering (LPF) operation. By squaring in-phase and quadrature components of optical carrier, the PNC stage is able efficiently to cancel the effects of laser phase noise and any random phase shift introduced by the channel. Therefore, the key advantage of this scheme compared to other CV-QKD schemes shown in the art, is that we can retrieve the transmitted PSK/QAM symbols without frequency fluctuation and phase noise, originating from the laser.

Initial experimental results employing a single 2 GHz RF subcarrier, carrying QPSK symbols, indicate that the RF-assisted CV-QKD system can provide unconditional secure transmission, with commercial PIN photodetectors; and the maximum SKR of >12 Mbit/s can be obtained in lossless channel per single subcarrier (of bandwidth 2 GHz). By employing SCM with 4 GHz spacing, with 10 subcarriers, combined with polarization division multiplexing, we can achieve SKRs exceeding 1.44 Gb/s, when 64-QAM is used. Now by employing the supercarrier approach, with 10 optical supercarriers, SKR exceeding 14.4 Gb/s can be archived. Finally, by employing OAM multiplexing, with 7 OAM modes, aggregate SKR exceeding 100 Gb/s will be achieved, which will be many orders of magnitude higher than SKR in any DV-QKD scheme reported so far. To improve SKRs further, instead of conventional QAM, the channel capacity achieving signal constellations should be used.

At this point, while we have presented this disclosure using some specific examples, those skilled in the art will recognize that our teachings are not so limited. Accordingly, this disclosure should be only limited by the scope of the claims attached hereto.

The invention claimed is:

1. In a communications network comprising a plurality of nodes, said network including hybrid free-space optical (FSO) radio frequency (RF) communications links (HFRCLs) interconnecting the plurality of nodes, said HFRCLs including at least one FSO channel each and at least one RF channel each, an adaptive, energy-efficient hybrid coded modulation technique for the HFRCLs comprising:

an HFRCL channel described by: $y=Hx+w$, where $x=[x_1 x_2 \ldots x_{M_{Tx}}]^T$ is a transmitted vector, $y=[y_1 y_2 \ldots y_{M_{Rx}}]^T$ is a received vector, $w=[w_1 \ldots w_{M_{Rx}}]^T$ is a noise vector, and H is an $M_{Rx}$-by-$M_{Tx}$ block channel matrix;

wherein the ith element of x is a super-symbol described by $x_i=x_i^{(FSO)}, x_i^{(RF)}$), where the first component is the symbol(s) transmitted over the FSO channel of the HFRCL channel and the second component is the symbol(s) transmitted over the RF channel of the HFRCL channel.

2. The communications technique according to claim 1 wherein when the FSO channel is in a good condition, only the FSO component is present, and when the FSO channel deteriorates to a pre-determined threshold, both FSO and RF channels are operated simultaneously.

3. The communications technique according to claim 2 wherein the FSO symbol is N-dimensional having different coordinates representing projections along orbital angular momentum (OAM) eigenvectors.

4. The communications technique according to claim 1 wherein the super symbol consists of unequal numbers of FSO and RF symbols.

* * * * *